United States Patent
Brazley

[19]

[11] Patent Number: 6,095,818
[45] Date of Patent: Aug. 1, 2000

[54] WHEEL PUZZLE GAME BOOK

[76] Inventor: William I. Brazley, 101 Algiers Ct., Apt. 1, Louisville, Ky. 40218

[21] Appl. No.: 08/988,144

[22] Filed: Dec. 10, 1997

[51] Int. Cl.[7] .............................. G09B 1/20; G09B 1/24
[52] U.S. Cl. ........................................ 434/173; 434/174
[58] Field of Search ................... 434/161, 167, 434/173, 174

[56] References Cited

U.S. PATENT DOCUMENTS

| | | | |
|---|---|---|---|
| D. 342,547 | 12/1993 | Putman et al. | D19/64 |
| 465,834 | 12/1891 | Clarkson . | |
| 500,824 | 7/1893 | VonTassel | 434/173 |
| 1,470,845 | 10/1923 | Johnson | 434/174 |
| 2,200,206 | 5/1940 | Myers . | |
| 3,248,809 | 5/1966 | Stifano, Jr. . | |
| 3,347,204 | 10/1967 | Beall . | |
| 3,391,476 | 7/1968 | Sher | 434/174 X |
| 4,340,373 | 7/1982 | D'Andrade et al. | 434/174 |
| 4,865,324 | 9/1989 | Nesis . | |
| 4,902,230 | 2/1990 | Jones | 434/174 X |

FOREIGN PATENT DOCUMENTS

| | | | |
|---|---|---|---|
| 1313020 | 11/1962 | France | 434/173 |

Primary Examiner—John A. Ricci
Attorney, Agent, or Firm—David W. Carrithers; Carrithers Law Office

[57] ABSTRACT

An educational picture book including a device having a number of rotating indicator wheels in alignment one with another, each of the indicator wheels including indicia thereon such as the letters of the alphabet, numbers, pictures, braille, symbols, or combinations thereof, whereby pictures or words in the books can be expressed by alignment of the indicator wheels.

20 Claims, 4 Drawing Sheets

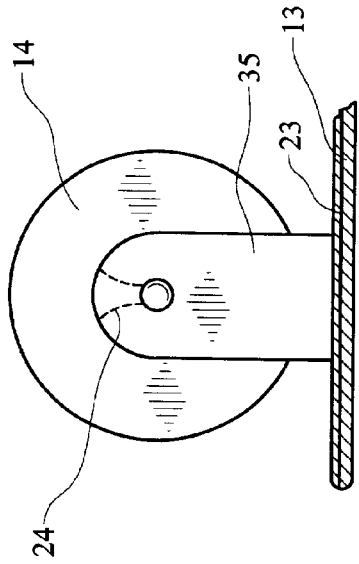
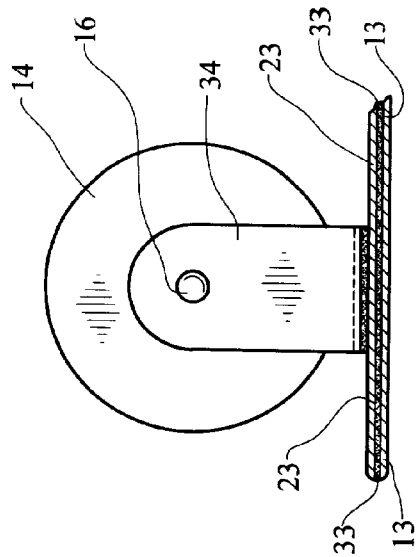
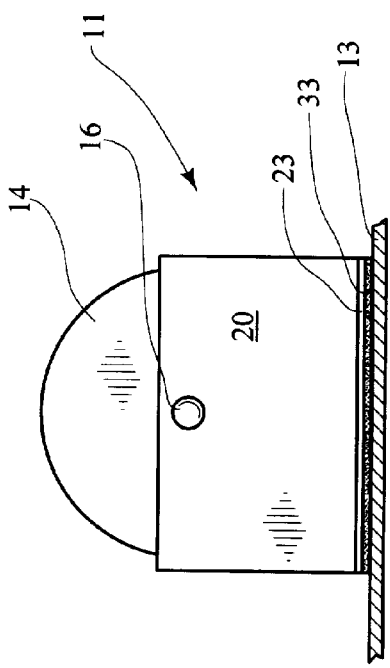
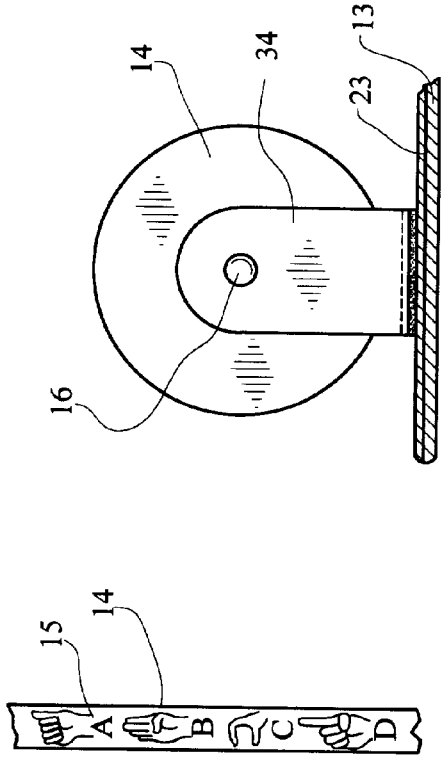

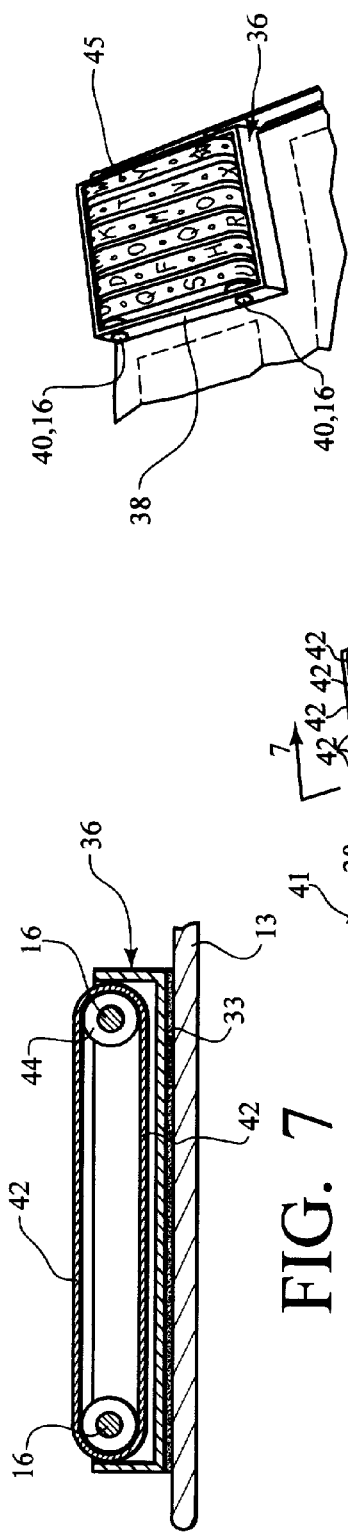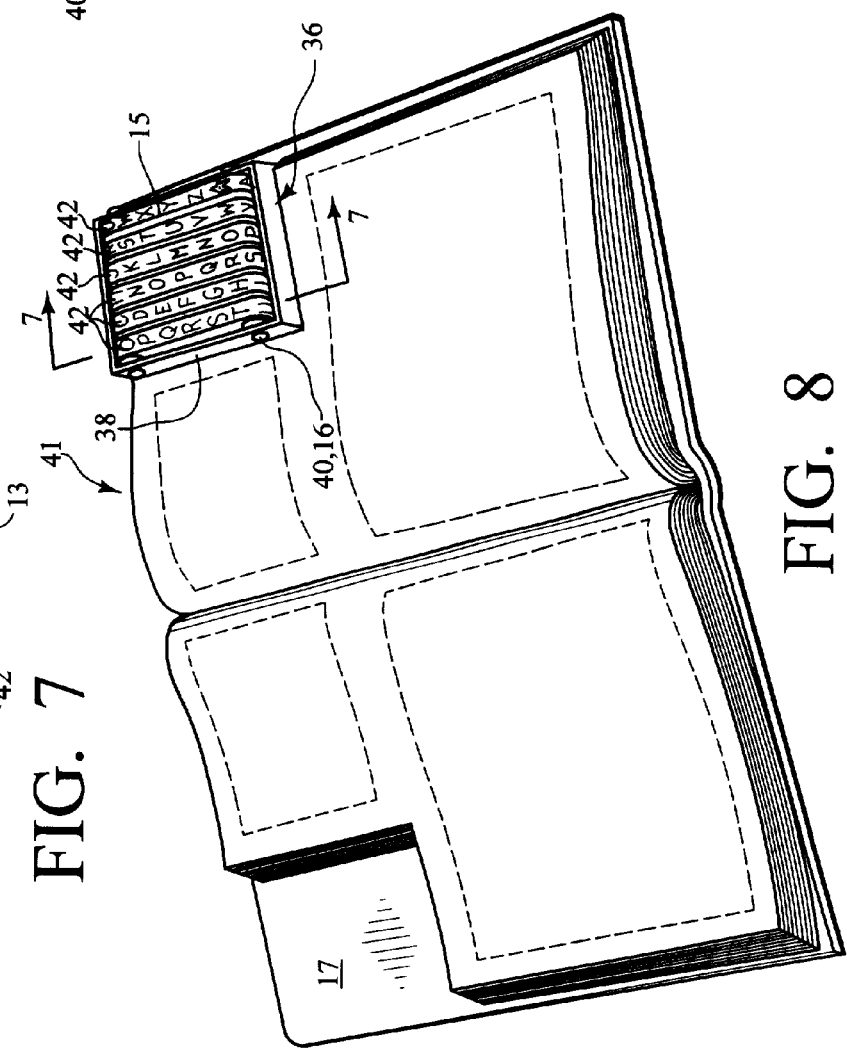

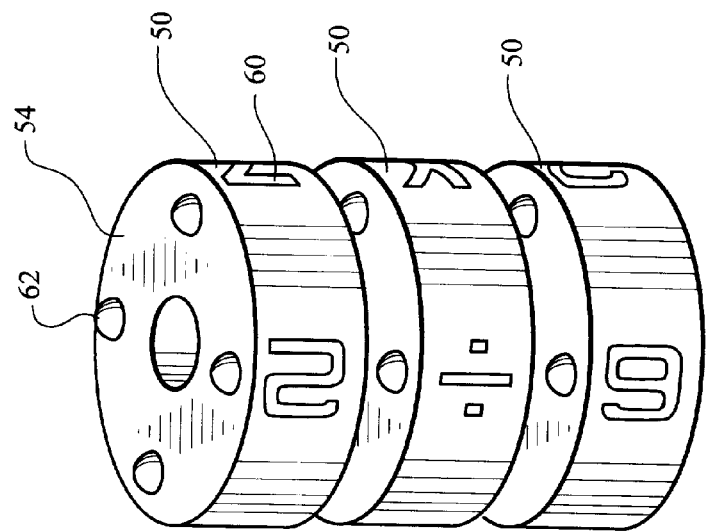
FIG. 10
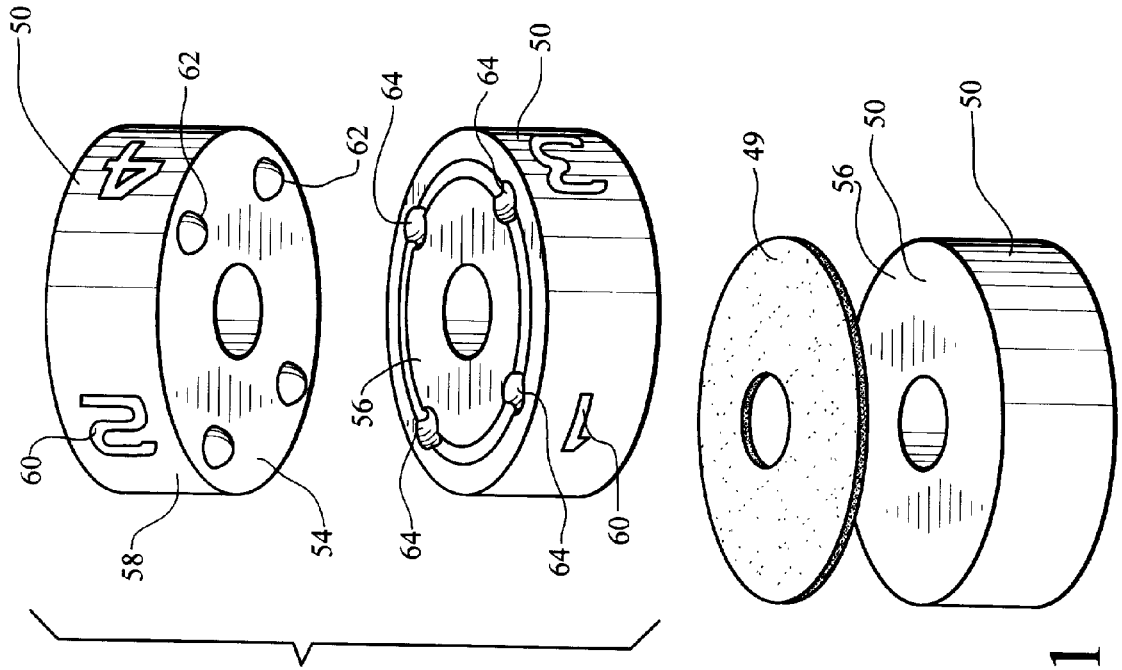
FIG. 12
FIG. 11

WHEEL PUZZLE GAME BOOK

BACKGROUND OF THE INVENTION

The present invention is designed for use by children between the ages of three and five years. Its design provides a means for stimulating the imagination of children and promote their curiosity for learning. It is a combination educational learning tool and toy which provides children with a positive impression of books at an early age.

The present invention is directed to an educational picture book including a device having a number of rotating wheels in alignment one with another, each of the wheels including indicia thereon such as the letters of the alphabet, numbers, pictures, braille, symbols, or combinations thereof, whereby pictures or words in the books can be expressed by alignment of the indicator wheels. For instance, several of the indicator wheels rotating around the common shaft may contain the letters of the entire alphabet. The number of indicator wheels will determine the length of the word the child would spell. To teach counting or simple math problems, the indicator wheels would contain numbers, symbols, or combinations thereof such as mathematical operation signs. The indicator wheels may also have pictures, braille, or symbols such as the alphabet making up foreign languages thereon.

SUMMARY

The present invention defines a picture book having a device used in combination therewith utilizing at least one rotatable indicator wheel having indicia thereon such as letters of the alphabet, numbers, pictures, braille, symbols, code, or combinations thereof.

The preferred embodiment is comprised of plastic materials, however, wood, paper, corrugated material, or combinations thereof could also be used to fabricate the wheels and support structure therefor.

The support structure may simply include a base having a pair of arms extending upward normal thereto for supporting a shaft thereinbetween, whereby the indicator wheels have a hole through the center thereof for coaxial rotation about the shaft. The indicator wheels can be rotatably aligned to provide for a particular symbol or spelling of a word in accordance with directions from the book.

BRIEF DESCRIPTION OF THE DRAWINGS

FIG. 2 is a side view of the rotary wheel puzzle device of FIG. 1;

FIG. 3 is a side view of an alternate embodiment showing a pair of arms extending upward from a base to support a shaft having a plurality of wheels thereon;

FIG. 4 is a side view of FIG. 3 showing removable arms attached to the base with hook and loop fasteners;

FIG. 5 is a side view showing base of the entire rotary wheel puzzle device being secured to the surface of the book by a hook and loop fastener;

FIG. 6 is a top view showing indicia imprinted on the surface of a wheel;

FIG. 7 is a side view showing an alternate embodiment of the present invention whereby a double roll rotary puzzle book utilizes a pair of shafts supported spaced apart from one another;

FIG. 8 is perspective view showing a book including the double roll rotary puzzle book of FIG. 7;

FIG. 9 is a perspective view showing the book and double roll rotary puzzle of FIG. 8 including small holes, dimples, or protuberances formed in the bands at selected positions inbetween the indicia providing a means for rotating the bands;

FIG. 10 is a perspective view showing multiple indicia wheels for use with the rotary wheel book of the present invention; and FIG. 11 is an exploded perspective view of an expandable member biasing the wheels.

FIG. 12 is an exploded perspective view of the wheels of FIG. 10 showing indicia wheels including protuberances which register with notches for aligning the symbols on the peripheral edge at a predetermined position.

DETAILED DESCRIPTION OF THE INVENTION

Figure 1:
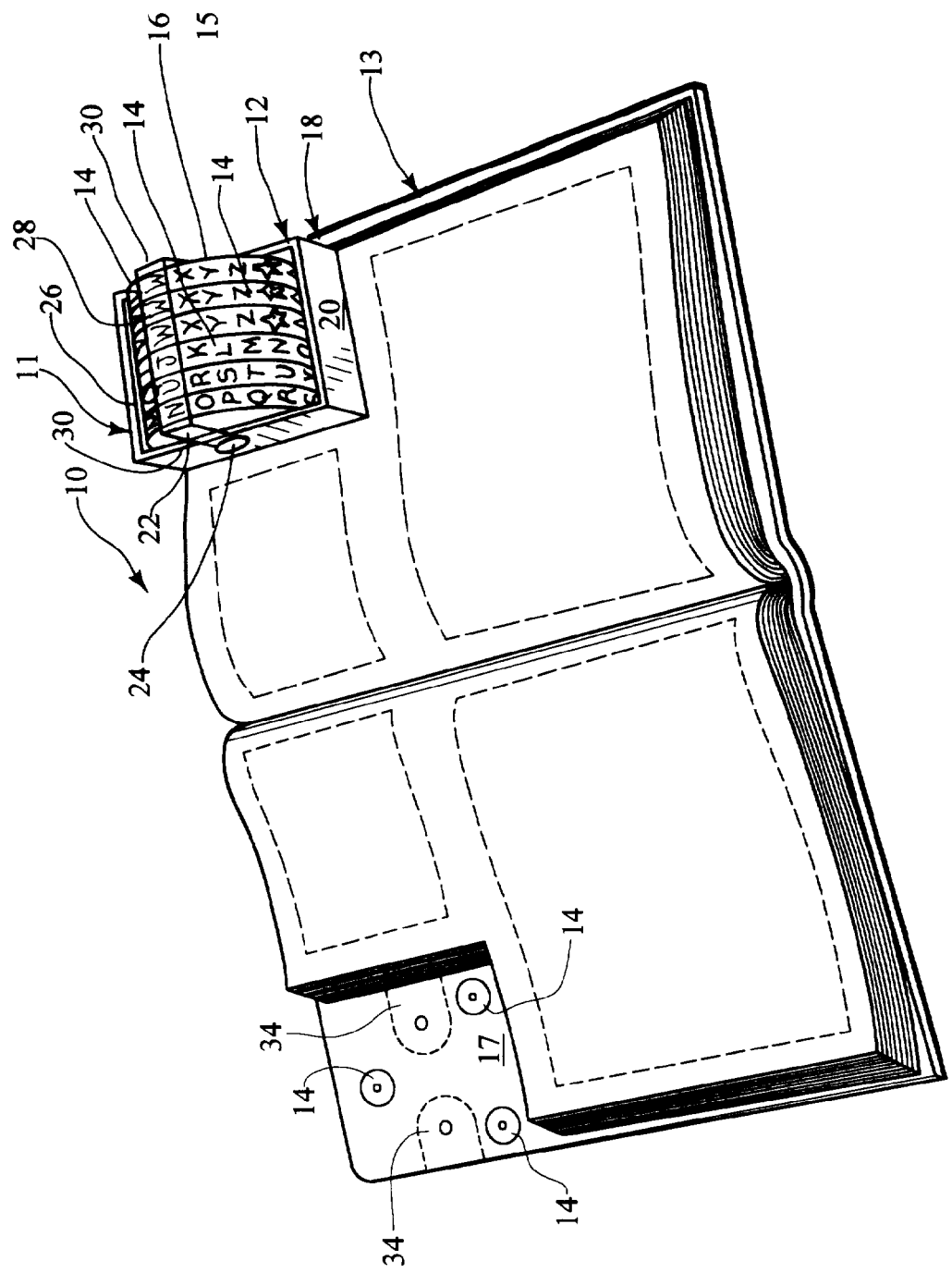
FIG. 1 is a perspective view of the present invention showing the wheel puzzle game book having rotary wheel puzzle device with a plurality of indicator wheels rotating around a common shaft supported by a frame secured to the inside cover of the book.

The present invention will now be described with reference to the drawing figures. The rotary wheel puzzle book device is generally referenced by the numeral 10. Wood, metal, and preferably plastic may be used in constructing the rotary wheel puzzle book 10 which may integrally molded in one piece or formed from separate pieces connected together.

The rotary wheel book 10 of the present invention shown in FIG. 1, comprises a rotary puzzle wheel device 11 and book 13. FIG. 1 shows a rotary wheel device 11 having a plurality of indicator wheels 14 rotatably supported on a common axle or shaft 16. Each of the indicator wheels 14 including indicia 15 thereon such as shown in FIG. 6, including the letters of the alphabet, numbers, pictures, braille, symbols, or combinations thereof, whereby pictures or words in the books can be expressed by alignment of the indicator wheels 14. The indicia may be printed or imprinted directly onto the surface of the indicator wheels 14 or a strip of material such as plastic, paper, or rubber band may have indicia printed thereon and the strip of material may be held to the indicia wheel 14 by an adhesive or elastic means. As shown in FIGS. 1 and 2, the shaft 16 is supported by means for support 18 comprising a box 20 having sidewalls 22 extending upward from a base 23 consisting of the inner surface of the book cover, wherein the sidewalls 22 include a opening such as a groove, hole or depression 24 sized and shaped for cooperative engagement of the shaft 16 at a selected position. An indicator 26 may be used to align a plurality of marks printed or imprinted on the outer periphery of the wheels 14. The indicator 26 shown in FIG. 1 is a clear strip 28 having ninety degree bends near the distal ends forming support arms 30 which include holes therein for suspension upon the shaft 16. As shown the indicator 26 extends across the wheels 14 from one side to the other. The book 13 is shown having a cut-out portion to accommodate the shape of the rotary wheel puzzle device 11 which may be attached by removable means such as hook and loop fasteners, for example, VELCRO™, or slits may formed in the back of the book 13 so that complimentary tabs may be formed on the bottom of the rotary wheel puzzle device 11 for removable insert therein. Other means of permanent attachment such as an adhesive may also be used to secure the rotary wheel puzzle device 11 to the book 13. It is contemplated that the rotary wheel puzzle device 11 may also be used independently of the book 13 for the pages of the books 13 are typically comprised of thick paperboard material for use by small children.

The shaft 16 may be flexible so that after insertion through one or more of the indicator wheels 14 the distal ends of the shaft 16 can be inserted into the holes 24 of the sidewalls, or one of the sidewalls may incorporate a groove of varying width being greater from top to bottom whereby the distal end of the shaft 16 will snap into place in the hole 24.

The embodiment in FIG. 3 shows the means of support comprising a pair of arms 34 extending upward from a base 23 for cooperatively engaging the shaft 16.

The embodiment in FIG. 4 shows the means of support comprising a pair of arms 35 extending upward from a base 23 for cooperatively engaging the shaft 16. The pair or arms 35 are removably secured to the base 23 with a hook and loop fastener 33.

Hinged arms 34 can be fabricated from paperboard integrally formed with the book 13 and scored so that the hinged arms 34 can be recessed into the interior surface 17 of the book back and pried up into the "in-use" support position, whereby a shaft 16 such as a paperboard stick may be inserted therethrough. Moreover, the indicator wheels 14 may also be recessed into the book back and pulled therefrom for assembly, so that the rotary wheel puzzle book 10 provides a smooth flat package for shipping and storage.

The embodiment of the rotary wheel puzzle book 10 shown in FIG. 5, shows the entire rotary wheel puzzle device 12 being secured to the interior surface of the book 13 by a hook and loop fastener 33.

FIGS. 7–9 show an alternate embodiment of the present invention whereby a double roll rotary puzzle book 41 utilizes a pair of shafts 16 supported spaced apart from one another. As shown in FIG. 8, the means of support comprises a box 36 having sidewalls 38 extending upward therefrom, each sidewall 38 having opposing holes 40 therein to support and cooperatively engage a shaft 16. Strips of material or bands 42 having indicia 15 imprinted thereon are placed in position over the shafts 16 or small rollers 44 rotating on the shafts 16 forming a track system with one or more bands of indicia 15 rotating therearound. A plurality of rollers 44 is desirable so that the bands 42 may be rolled independently one from another to match symbols or letters. The double roll puzzle book 41 provides a means of using removable rotating bands, such as rubber bands, in the book 13 and maintain a generally flat profile, so that the double roll puzzle wheel apparatus is no thicker than the normal thickness of the book 13. Small holes, dimples, or protrusions 45 may be formed in the bands 42 at selected positions inbetween the indicia 15 providing a means for rotating the bands 42.

FIGS. 10–12 shows multiple indicia wheels 50 which may be used with the rotary wheel book 10 of the present invention. The indicia wheels 50 are described in U.S. Pat. No. 4,865,324 hereby incorporated by reference. Each indicia wheel 50 includes a first 54 and second face 56 and a peripheral edge 58 having a series of symbols 60 formed therealong.

In one embodiment, the indicia wheels 50 comprise magnetic rings which are stacked next to each other and held together by magnetic forces rotatable on a common shaft 16. Each of the indicia wheels 50 have protuberances 62 which are adapted to be received within cavities or notches 64 on the face of an adjacent indicia wheel 50. Adjacent indicia wheels 50 can rotate to a predetermined position wherein the protuberances 62 register with the notches 64 aligning the symbols on the peripheral edge 58.

In an alternate embodiment the indicia wheels 50 do not utilize magnetic forces, but are biased against one another by biasing means such as a shaft 16 having elastic properties, or by a expandable member 49 inserted between selected indicia wheels 50 or the surface of the outer indicia wheels contiguous with the side of the support means or end of the shaft 16. The indicia wheels 50 may also be formed of a compressible material such as rubber or soft plastic providing a means to hold the wheels in a selected position upon being rotated on the shaft 16. A strip of material such as an elastic band, or a tape may also be held to the peripheral edge of the indicia wheels 50 by a holding means such as an adhesive, in order to provide a means of changing the indicia.

While particular embodiments of the invention have been shown and described, it should be understood that the invention is not limited thereto, since many modifications are possible within the scope of the appended claims. The foregoing detailed description is given primarily for clearness of understanding and no unnecessary limitations are to be understood therefrom, for modifications will become obvious to those skilled in the art based upon more recent disclosures and may be made without departing from the spirit of the invention and scope of the appended claims.

I claim:

1. A rotary wheel book, comprising:

a book;

a base attaching to an interior surface of a cover of said book;

a shaft;

a pair of opposing supporting members extending upward normal from said base for supporting said shaft thereinbetween;

a plurality of wheels rotatably supported by said same shaft;

indicia viewable on the periphery of said wheels; and an indicator for selecting particular indicia on each of said wheels relating to the subject matter illustrated on a page of said book.

2. The rotary wheel book of claim 1, wherein said indicia comprises letters of the alphabet, numbers, pictures, braille, symbols, code, mathematical operation signs, and combinations thereof.

3. The rotary wheel book of claim 2, wherein said indicia is printed onto the surface of said indicator wheels.

4. The rotary wheel book of claim 2, wherein said indicia is printed onto a strip of material selected from the group consisting of a plastic, paper, or rubber band having indicia printed upon one side, said strip of material attaching to said indicia wheels by a means for holding.

5. The rotary wheel book of claim 1, wherein said book includes a cut-out portion to accommodate the shape of said rotary wheel puzzle device.

6. The rotary wheel book of claim 1, wherein said base of said rotary wheel puzzle device is removably attached to said book by holding means selected from the group consisting of hook and loop fasteners, at least one slit formed within the back of said book for insertion of at least one complimentary tab extending from said base of said rotary wheel puzzle device, and an adhesive.

7. The rotary wheel book of claim 1, wherein said pair of opposing supporting members extending upward normal from said base are removably secured to said base by hook and loop fasteners.

8. The rotary wheel book of claim 1, said pair of opposing supporting members hingedly connected to said base.

9. The rotary wheel book of claim 1, wherein said opposing supporting members are fabricated from paperboard integrally formed with said book, said opposing supporting members being scored and recessed into said interior surface of said cover of said book for prying up into the "in-use" support position.

10. The rotary wheel book of claim 1, wherein said indicator wheels are recessed into the interior surface of said cover of said book to be pulled therefrom for assembly.

11. The rotary wheel book of claim 1, wherein said indicia wheels comprise magnetic rings removably held together by magnetic forces rotatable on said shaft.

12. The rotary wheel book of claim 1, wherein said indicia wheels have protuberances adapted for receiving within notches formed on the face of said adjacent indicia wheel for rotating said adjacent indicia wheels around the shaft to a predetermined position wherein said protuberances register with said notches aligning said indicia.

13. The rotary wheel book of claim 1, wherein said indicia wheels are biased against one another by an expandable member inserted between selected indicia wheels.

14. The rotary wheel book of claim 1, wherein said indicia wheels are formed of a compressible material comprising rubber or soft plastic providing a means to hold the wheels in a selected position upon being rotated on the shaft.

15. The rotary wheel book of claim 1, including a second shaft supported and spaced apart from said shaft in alignment with one another;
   a second pair of opposing supporting members extending upward normal from said base for supporting said second shaft thereinbetween;
   a plurality of indicator wheels rotatably supported by said second shaft, and
   at least one band of material having indicia imprinted thereon placed in position on over said shafts forming at least one track having indicia thereon rotating therearound.

16. The rotary wheel book of claim 15, including a plurality of rollers supported by said shaft and said second shaft for rotatably supporting a plurality of said bands.

17. The rotary wheel book of claim 15, wherein said bands includes small holes spaced apart providing means for gripping and rotating said bands.

18. The rotary wheel book of claim 15, wherein said bands includes irregularities formed therein providing means for gripping and rotating said bands.

19. The rotary wheel book of claim 15, wherein said bands comprise tape.

20. The rotary wheel book of claim 15, wherein said bands are covered with tape having indicia thereon.

* * * * *